United States Patent [19]

Nuytkens

[11] Patent Number: 4,841,544
[45] Date of Patent: Jun. 20, 1989

[54] DIGITAL DIRECT SEQUENCE SPREAD SPECTRUM RECEIVER

[75] Inventor: Peter Nuytkens, Watertown, Mass.

[73] Assignee: The Charles Stark Draper Laboratory, Inc., Cambridge, Mass.

[21] Appl. No.: 50,224

[22] Filed: May 14, 1987

[51] Int. Cl.$^4$ .............................. H04K 1/00
[52] U.S. Cl. .................................. 375/1
[58] Field of Search .................. 375/1, 86, 87

[56] References Cited

U.S. PATENT DOCUMENTS

| | | | |
|---|---|---|---|
| 4,392,232 | 6/1983 | Andrew et al. | 375/86 |
| 4,445,118 | 4/1984 | Taylor | 342/357 |
| 4,457,006 | 6/1984 | Maine | 375/87 |
| 4,494,238 | 1/1985 | Groth, Jr. | 375/1 |
| 4,575,861 | 3/1986 | Levreault | 375/1 |
| 4,665,404 | 5/1987 | Christy et al. | 342/463 |
| 4,701,934 | 10/1987 | Jasper | 375/1 |

*Primary Examiner*—Salvatore Cangialosi
*Attorney, Agent, or Firm*—Lahive & Cockfield

[57] ABSTRACT

A direct sequence spread spectrum receiver for receiving an RF carrier radio signal modulated with a message signal in accordance with a code having a fundamental frequency converts the received signal to an IF signal centered about a frequency $f_o$ corresponding to the code fundamental frequency offset by a Doppler shift. The IF signal is digitized and sampled at a local clock frequency to develop N-bit digital signals. Locally generated digital phase shifted sine and cosine signals at frequency $f_o$ are multiplied by a local code to obtain local 1-bit IF signals which are then correlated with the digitized IF signals to develop in phase and quadrature component signals. A tracker uses the component signals to translate the frequency of the digital local IF signal to track the Doppler shift, to maintain the local sampling frequency at $4f_o$, and to maintain the local code generator in synchrony with the code of the received signal. Except for the IF down conversion, the receiver employs all digital circuitry. The receiver architecture is adapted to a low power sequential tracking microreceiver.

12 Claims, 4 Drawing Sheets

DIGITAL DIRECT SEQUENCE SPREAD SPECTRUM RECEIVER

BACKGROUND

The present invention relates to radio receiving apparatus of the type for receiving and processing direct sequence spread spectrum radio signals. Such radio signals are commonly used in satellite communication systems, and particularly in navigation systems such as the GPS system, and in other communications systems requiring a high level of immunity to Gaussian noise or jamming.

The GPS system, discussed below by way of illustration, is a satellite based global spread spectrum passive radio navigation system which enables a properly equipped user to calculate his position and his velocity to an accuracy which may, for example, amount to a few meters (a few tenths of meters per second, respectively), in three dimensions. Worldwide coverage is obtained with a network of satellites in dispersed non-geosynchronous orbits, with a minimum of six and an average of eight satellites visible at all times from any point on the earth's surface. All satellites transmit signals referenced to a common system time continuously on two common frequencies around 1575 MHz ($L_1$) and 1228 MHz ($L_2$). The signals consist of ranging codes, unique to each satellite which are modulated with a data stream which gives the user an accurate position of the transmitting satellite, an almanac for the whole system to enable him to choose the best satellites, and various corrections and status information.

Each transmitted signal is spread over a wide band by modulation with a binary pseudo-noise (PN) code sequence generated at a code chip frequency substantially less than the RF carrier frequency, at approximately 10 MHz. In general, the received signal is demodulated by multiplying the incoming modulated signal by a coherent replica of the carrier, and low pass filtering to strip the carrier, then multiplying by the code sequence. By maintaining the locally generated code sequence in phase with the received code sequence, the transmitted message sequence results. The signal bandwidth is about 20 MHz at each frequency ($L_1$ and $L_2$), and the transmitted polarization is circular. Position is found by measuring the pseudo-ranges to four satellites. These are ranges measured by estimating the propagation time using a receiver clock which is not aligned with system time. Four such measurements enable the user's position and the time offset in his clock to be calculated. Likewise, four Doppler measurements enable the velocity and clock frequency error to be found.

The received signal levels are typically 30 db below thermal noise, and the ground receiver requires narrow bandwidth tracking loops to lock onto the signal. The hardware necessary to perform the required signal discrimination and amplification is complex and costly. In general, prior art receivers include a separate channel for each satellite to be tracked. Each channel includes analog circuitry for amplification and for phase and quadrature determination, which introduces considerable noise into the system, and further introduces errors, due, for example, to variations or mismatching of components and processing in the different channels.

OBJECTS AND SUMMARY OF THE INVENTION

It is an object of the invention to provide a simplified construction for a direct sequence spread spectrum receiver.

It is another object of the invention to provide an IF sampling direct sequence receiver having a common IF converter stage for all channels.

It is another object of the invention to provide an IF sampling direct sequence receiver with digital tracking of the code and carrier.

It is another object of the invention to provide an IF sampling direct sequence receiver wherein the sampling rate is controlled to be an approximately integral multiple of the IF frequency.

These and other features of the invention are obtained in a direct sequence spread spectrum receiver for receiving an RF carrier radio signal modulated with a message signal in accordance with a code having a fundamental frequency, wherein the receiver first converts the received signal to an IF signal centered about a frequency $f_0$ corresponding to the code fundamental frequency offset by a Doppler shift. The IF signal is sampled and digitized at a local sampling clock frequency $f_s$ to develop N-bit digital signals. Digitized phase shifted sine and cosine signals at frequency $f_0$ are generated, and these signals are multiplied by a local 1-bit code to obtain local 1-bit IF signals, which are then correlated with the digitized IF signal to develop digital in phase and quadrature component signals.

A tracker uses the digital component signals to translate the frequency of the digital local IF signal to track the Doppler shift, and to maintain the local code generator in synchrony with the code of the received signal.

In one further preferred embodiment, a receiver according to the invention includes a common IF converter and digitizer, and a single digitally-implemented signal discriminating and tracking section. Plural satellites are tracked by successively tracking and demodulating the signal from each satellite, or by maintaining the digitized signal of each channel as a separate block of data in memory and employing fast multiplexers and a data processor to process the signals from all satellites. Preferably, the tracker of the receiver includes a delay locked loop for developing early and late codes, and means for comparing signals demodulated with the early codes to signals demodulated with the late codes so as to determine the offset of the local code from the code state of the received signal. In another or further embodiment, the tracker includes a frequency locked loop for correcting measured carrier phase errors.

BRIEF DESCRIPTION OF DRAWINGS

These and other features will be understood from the following description with reference to the drawings, in which.

DETAILED DESCRIPTION OF ILLUSTRATED EMBODIMENTS

Figure 1:
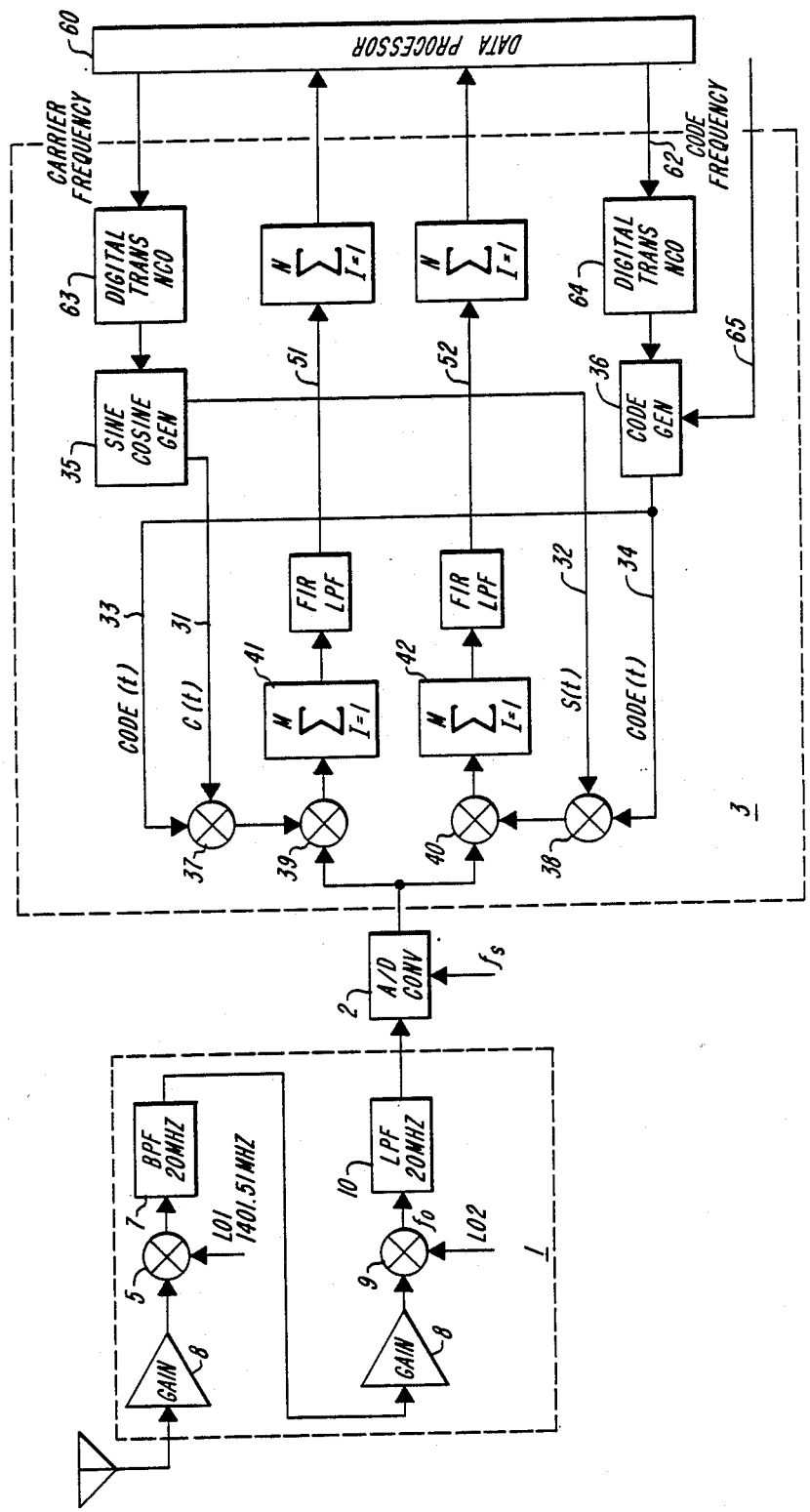
FIG. 1 shows a block diagram of a receiver according to the invention.

FIG. 1 shows a block diagram of a direct sequence spread spectrum receiver according to the present invention having an RF signal converter 1, a digitizing IF signal sampler 2, a code demodulating signal extractor 3, and a data processing signal tracking section 4.

A particular embodiment will be described, by way of illustration, for receiving GPS navigational positioning signals. In this embodiment, the receiver receives an $L_1$ band signal at 1575.42 MHz and an $L_2$ band signal at 1227.6 MHz. The signal converting stage 1 performs IF down conversion and includes an amplifier 6 followed by a first local oscillator section 5 where the amplified received signal is mixed with the local oscillator signal at a frequency of 1401.51 MHz to provide a signal at a common IF frequency of 173.91 MHz for both the $L_1$ and $L_2$ satellite signals. This IF signal is filtered by filter 7, and amplified by amplifier 8. It then passes through a second local oscillator stage 9 where it is mixed with a local oscillator signal at 161.41 MHz to form an IF signal centered at 12.5 MHz. The second local oscillator frequency is selected to obtain an IF signal at a frequency slightly greater then the 10 MHz GPS code frequency offset by the maximum expected carrier Doppler. At any given time, the actual IF frequency thus varies directly with the Doppler shift. This IF frequency is denoted $f_o$.

The signal then passes through a 20 MHz low pass filter 10 as an amplified IF output signal on line 11.

The IF signal at frequency $f_o$ is then sampled and digitized at a sampling frequency $f_s$ by A/D converter 2 to form a received N-bit digital IF signal. For purposes of a commercial GPS receiver of moderate accuracy, useful for example in general aviation and small boat navigation, as few as 4-bit signals (3 amplitude bits and 1 sign bit) may be used, although preferably higher-accuracy 6- or 8-bit A/D conversion is employed. The N-bit digitized signals are sent to first and second signal discrimination stages 3a, 3b of the signal extractor section 3 to develop in phase and quadrature tracking component signals. These signals are then processed to provide tracking correction signals to a local IF frequency generator and to a local code generator so as to demodulate the IF converted signal. Preferably the tracking section also controls a local clock used to maintain the sampling frequency $f_s$ of converter stage 2 to be four times $f_o$, and to clock the code from the code generator at slightly greater clock rate $4f_o + \epsilon$.

Signal extraction section 3 receives digitized cosine signals C(t) along line 31 and digitized sine signals S(t) along line 32 from a sine/cosine generator 35 which generates 1-bit, $\pi/4$ phase shifted signals at the frequency $f_o$. A code generator 36 also provides a 1-bit local code along lines 33, 34 to the extraction section 3. The local code is combined with the cosine and sine signals in multipliers 37, 38, respectively, to produce digital local 1-bit IF signals. These signals are correlated with the N-bit digitized IF converted RF signal by N×1-bit multipliers 39, 40, respectively, and the 1-bit product signals are integrated in adders 41, 42 and filtered by FIR low pass filters 43, 44 to provide an in phase component signal I(t) along line 51 and a quadrature component signal Q(t) along line 52, which are then processed for tracking the received signal. The adders 41, 42 provide process gain.

The in phase component signal 51 and the quadrature component signal 52 pass to data processor 60 which determines the Doppler frequency of the satellite being tracked, and the code shift. The code and the carrier frequency information are provided by processor 60 along lines 62, 61 respectively to a digital translating numerical control oscillator (NCO) 63 which controls the sine/cosine generator 35, and to a digital translating NCO 64 which controls the code generator 36. The NCO's provide digitized frequency signals at the code fundamental frequency and at the Doppler corrected sampling frequency, both of which are substantially above the data processor's clock frequency. Processor 60 also determines a signal indicative of code state offset from the correlation signals and provides a code state signal along line 65 to the code generator 36.

Initially, in a signal acquisition mode, a receiver according to the present invention locates the correct frequency and code state by setting approximate frequency and time code parameters, and accumulating signal values in accumulators 41, 42, 51, 52, performing a fixed bin sorting search of signal magnitude for each of a plurality of code and frequency ranges so as to identify a maximum strength signal. Once the carrier frequency and code have been thus identified, the signal is tracked to maintain the local IF signals and code in synchrony with the received digitized IF signal, using tracking circuitry which is described in greater detail below, in connection with FIGS. 2 and 3 and the description of the operation of the tracking NCO.

Figure 4:
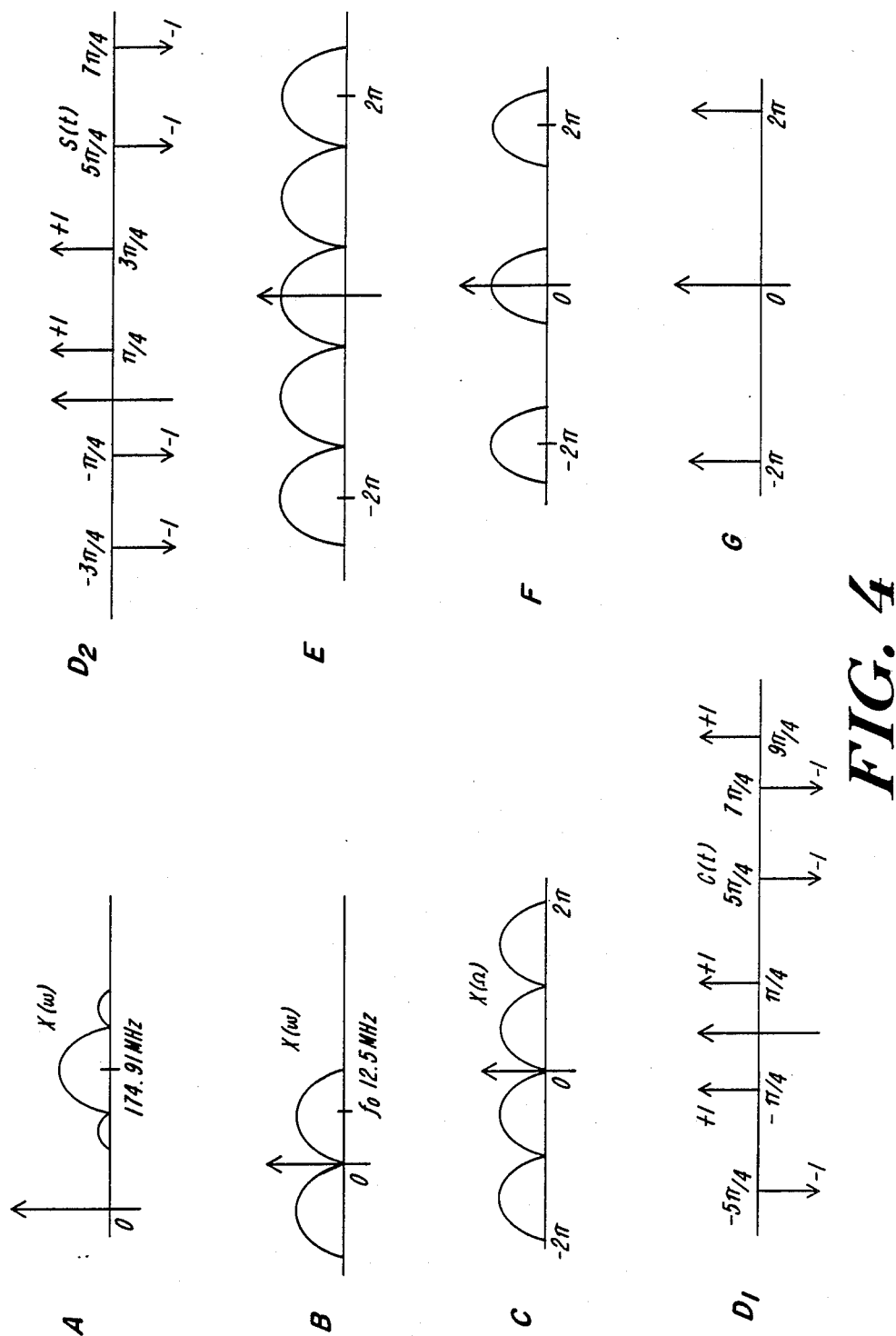
FIG. 4 shows plots of signals at different stages in the receiver of FIG. 1.

By way of introduction to the digital domain processing underlying the present invention, FIG. 4 shows frequency domain plots of signals at the system points designated A–G in FIG. 1, illustrating the signal processing of the invention. The signal shown in line A is the frequency domain plot of the filtered and shifted RF signal after mixing with the 1401.51 MHz local oscillator signal LO1. As shown, the signal is spread over the spectrum about 174.91 MHz. Line B shows the same signal after mixing with the second local oscillator signal and filtering, with the IF signal now spread about a frequency $f_0$ which is equal to the code fundamental frequency plus Doppler. Line C shows the same signal which is digitally sampled at the $4f_0$ sampling rate. Line $D_1$ shows the digital cosine signal provided on line 31 for extracting the in phase component of the digitized IF converted signal C, and line $D_2$ shows the digital sine signal provided on line 32 for extracting the quadrature component. Line E shows the form of a received IF signal which is not correlated with the local IF in phase signal by multiplier 34, and line F shows the low-pass filtered form of such signal. Finally, line G shows the accumulated correlated in phase output signal on line 51.

Figure 2:
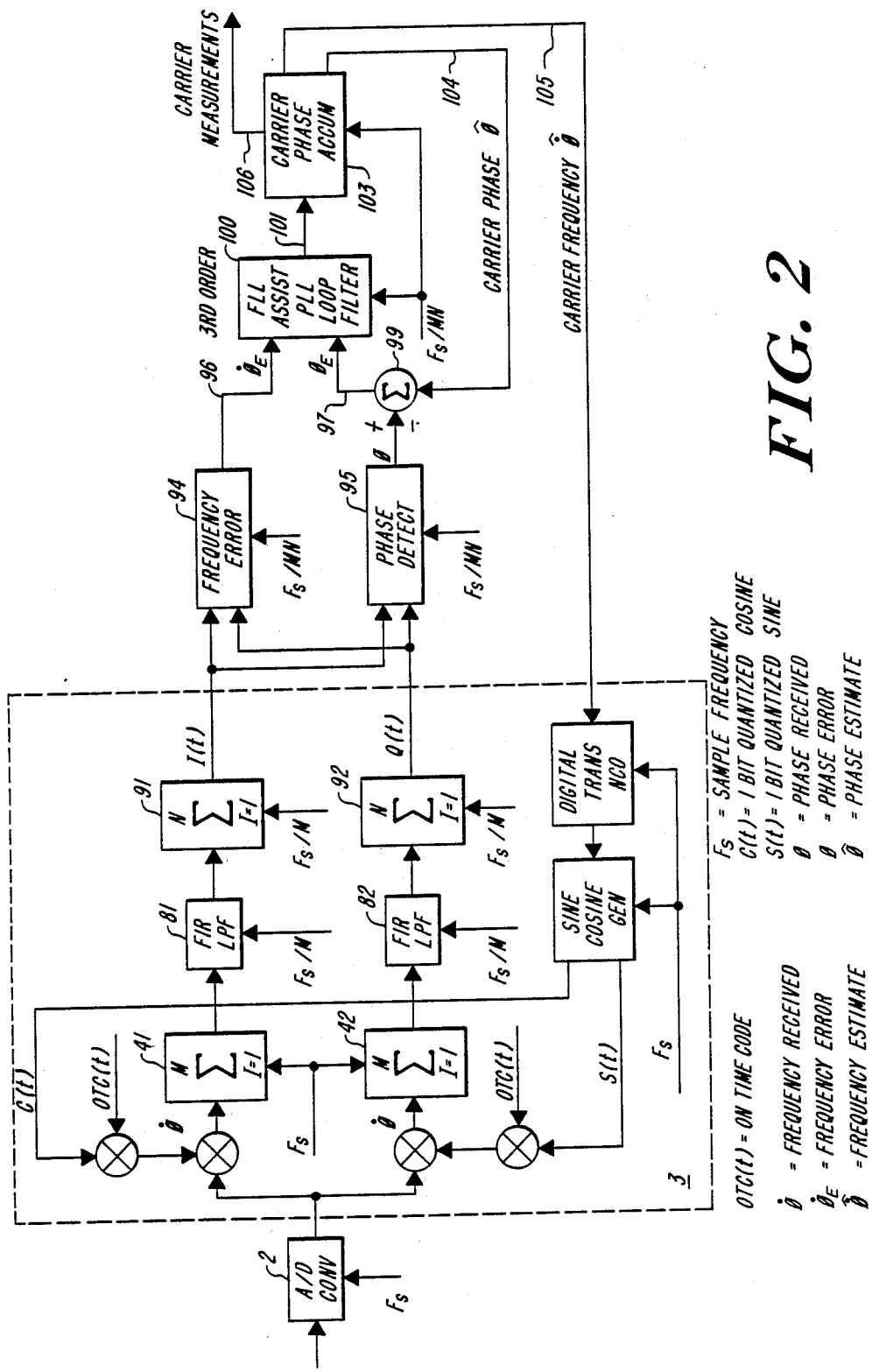
FIG. 2 shows a further detail of a preferred carrier tracking implementation of the receiver of FIG. 1.

FIG. 2 shows further details of a receiver as in FIG. 1 with a preferred digital carrier tracking and processing implementation. In this embodiment, the digitized IF converted signal is sampled at a sampling frequency $f_s$ which is maintained equal to four times the code fundamental frequency plus Doppler, and the digitized signal is correlated with local 1-bit IF signals to produce correlation signals accumulated in adders 41, 42 as the in phase and quadrature tracking signals. The local code on lines 33, 34 is an on-time code, that is, a code synchronized with the transmitted code. The code synchronization is discussed more fully below, in relation to FIG. 3. Adders 41, 42 accumulate the correlation signals for M clock intervals, at which time the sums pass by gates 81, 82 to accumulators 91, 92 which accumulate N sums. The total M×N accumulated in phase signal I(t) and accumulated quadrature signal Q(t) are provided as inputs to software frequency error unit 94 and phase detection unit 95 which provide respective outputs along lines 96, 97 indicative of the received frequency error and a phase increment signal. The carrier frequency error is calculated in a straightforward way in terms of products of the current and previous accumulated sample values of I(t) and Q(t), divided by the time interval between samples.

The carrier phase increment from detector 95 is accumulated in counter 99 to provide a phase error signal 97 to a frequency lock assisted phase locked loop filter 100 which corrects the third order signal contribution from the Doppler and phase, to provide a corrected carrier phase signal 101 to carrier phase accumulator 103. The phase accumulation in phase accumulator 103 is provided along first output 104 as a phase correction signal to the minus (−) input of counter 99 so that its output 97 represents the correct carrier phase error, within $\pi/4$. Accumulator 103 also develops a carrier frequency estimate output 105 for which a k-function, discussed below, is calculated in real time and is provided to IF tracking NCO (63 of FIG. 1) to track the received signal at the Doppler-varied frequency $f_o$, for signal demodulation. The tracking NCO 63 adjusts the sampling frequency $f_s$ to be four times $f_0$ and develops control signals to produce the digitized $\pi/4$ shifted sin/cos local IF signals from generator 35 at frequency $f_o$ as discussed below. Other direct carrier measurements 106 are determined at this stage, and may be applied to other receiver functions. For example, absolute amplitude signals may be used to initially determine if approximate code alignment has been achieved, and may also be used to control the process gain for optimal signal to noise ratio, or may be used for antenna steering or array selection.

The numerical control oscillator provides direct digital frequency synthesis as follows. Processor 60 provides a value k to NCO 63 which then increments an N-bit accumulator by the k value at a high clocking rate f which illustratively, is approximately 50 MHz. The value k is calculated by the data processor 60 such that the output of the accumulator corresponds to the phase of the synthesized frequency, and the accumulator overflow defines the period of the wave form. The NCO accumulation circuit behaves like a fractional divider with a sequence of non-uniform overflows which repeat with a pattern equal to the desired frequency period. The bits of the accumulator output drive a sine PROM look up table and a cosine table, which provide amplitude quantization signals for the digitized sine and cosine signals, S(t), C(t) discussed above.

In the prototype receiver design, the data processor 60 computes the function k so as to drive the NCO for generating an output ramp signal which is incremented at a clocking rate of $4f_0$, and which repeats at frequency $f_0$, the desired intermediate frequency equal to the code fundamental frequency plus Doppler. The output ramp signal also determines a sampling clock signal for the A/D converter, so that the converter samples the downconverted IF signal at the $4f_0$ rate. By thus sluing the sampling frequency $f_s$, the receiver maintains the locally generated digital signals within $\pi/4$ of the phase of the received digitized signals.

Figure 3:
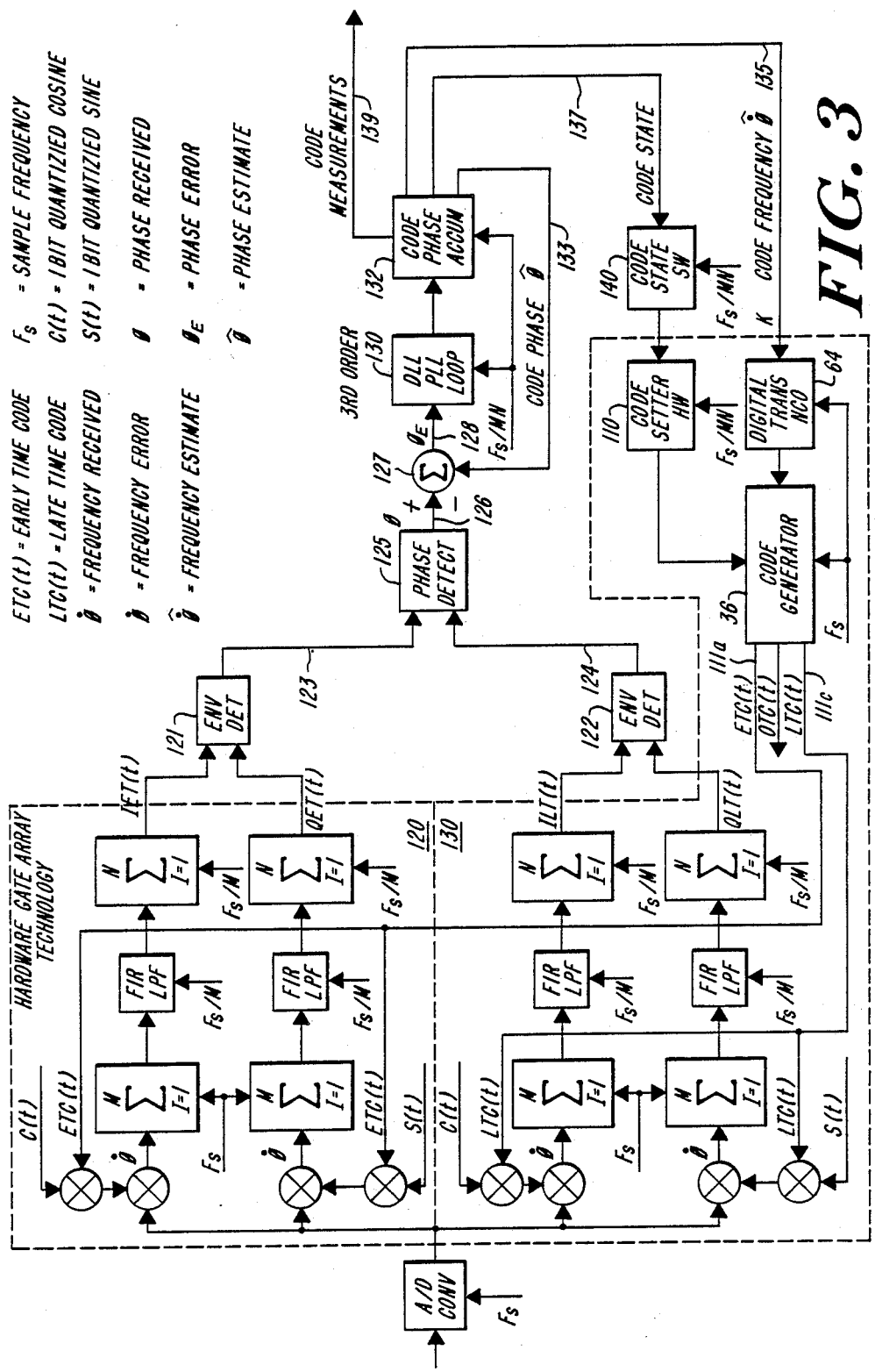
FIG. 3 shows further detail of a preferred code tracking implementation of the receiver of FIG. 1.

FIG. 3 shows a schematic block diagram of a preferred embodiment of the code tracking section of a receiver according to FIG. 1.

In this embodiment, a single code generator 36 receives control signals from a separate hardware code setter module 110 and produces, in addition to an on-time code OTC(t), an early time code ETC(t) on line 111a, which falls in the interval one half code chip early of the on-time code, and a late time code LTC(t) on line 111c, which falls in the interval one half code chip late of the on-time code. The early and late time codes are separated by a fixed time interval, and are provided to separate processing sections 120, 130, respectively, each of which combines a sine or cosine signal S(t), C(t) with the local time code and multiplies the combined signal with the received IF signal in a manner which is substantially identical to that described for the signal extraction section 3 of FIG. 1. Section 120 develops in phase and quadrature component signals IET(t) and QET(t) of the received signal multiplied by the early code, and section 130 produces corresponding in phase and quadrature signals ILT(t) and QLT(t) of the IF signal multiplied by the late code.

The early and late in phase and quadrature outputs are fed to respective early and late envelope detection sections 121, 122 which provide outputs 123, 124 indicative of the power of the demodulated signals. When the two power signals are equal, the early and late codes are symmetrically offset from precise code phase alignment. When the power signal difference is consistently positive, the timing of the locally generated code is advanced; when negative, it is delayed with respect to the received code. Code phase detector 125 subtracts the early from the late power to produce a code phase error signal which is provided along line 126 to counter 127. Counter 127 accumulates the signals to produce a code phase offset signal 128. This offset signal passes to phase locked loop 130 and to code phase accumulator 132, which provide a code phase correction signal on line 133 to the (−) minus input of counter 127, a code frequency estimate on line 135 to the code NCO (64 of FIG. 1), a code state signal 137 to a software module 140 which tracks the code state and controls the hardware code setter 110. The code measurements 139 are also provided to the data processor 60.

It will be appreciated that the accumulated early and late code signal correlation values are necessary to precisely track the code phase within the processor, but are not optimal for carrier tracking since their magnitudes are substantially less that the on-time signal correlation values. Thus, the carrier tracking section of FIG. 2 uses the on-time code. Nonetheless, substantial reduction in hardware is obtained because a single code generator generates the early, on-time and late codes, and because the code generator need not include a code-setter. A single code setter may control the code generators for each channel in a multi-channel simultaneously tracking embodiment.

As described, the receiver of FIG. 1 has minimal analog circuitry which is used for the down conversion to IF of both the $L_1$ and $L_2$ satellite signals. This IF conversion circuitry may be used to process the signals received from all satellites (four or more) being tracked. A common A/D converter 2 is also used to provide the digitized IF signal, and all signal acquisition and tracking is performed thereafter by digital processing. The code and carrier wipeoff is performed using the 1-bit local IF signal, and may be performed by a single XOR gate, with process gain provided by a simple adder.

Thus, the receiver may sequentially track four or more different satellite signals using a single IF signal derived from a common antenna for all channels. Since a "channel" amounts to a defined area of memory, and the processing of each channel proceeds using the same software to derive the frequency and phase information which are used to track the signal and strip the Doppler from one satellite signal, such a sequentially tracking receiver requires only a single code generator and code state setter. Thus, the noise contribution of prior art analog receivers, and the problems inherent in channel matching where the gain, noise, phase delays and efficiency of stages and components differ in each receiver channel, are largely eliminated.

A preferred hardware implementation of a receiver according to the invention offers great simplification over prior art analog receivers. A microstrip antenna may provide the RF input for all channels, with a single monolithic microwave integrated circuit for the RF gain and down conversion stage. The remainder of the receiver architecture requires a single spread spectrum processing CMOS gate array, or CMOS CPU chip set, crystal oscillator and frequency synthesis circuitry.

The invention has been described with reference to particular preferred embodiments, by way of illustration, but is not limited thereto. The invention being thus described, variations and modifications will occur to those skilled in the art, within the scope of the invention, as defined by the following claims.

What is claimed is:

1. An improved direct sequence spread spectrum receiver for receiving and demodulating a transmitted RF carrier radio signal modulated in accordance with a transmitted code having a fundamental frequency, said radio signal being further characterized by a Doppler shift, wherein the receiver comprises
    means for receiving said radio signal,
    IF converter means for converting said received radio carrier signal to an IF converted signal centered about an intermediate frequency $f_o$ corresponding to said code fundamental frequency offset by said Doppler shift,
    N-bit analog to digital sampling means for sampling said IF converted signal at a sampling frequency $f_s$ thereby forming a digitized IF converted signal including a succession of N-bit digital signals,
    local IF means for developing digital local if signals, such means including
        (i) means for generating digital sin ($f_o$) and cos($f_o$) signals at said sampling frequency $f_s$
        (ii) code generating means for generating a local code at said sampling frequency
        (iii) means for multiplying the local code times each said sin($f_o$) and cos($f_o$) signal to obtain said local IF signals,
    correlator means for correlating the digitized IF converted signal with the local IF signals so as to develop in phase and quadrature components signals, and
    tracking means, responsive to the in phase and quadrature component signals for changing the sampling frequency to maintain it substantially equal to a multiple of the frequency of the digitized IF converted signal.

2. A receiver according to claim 1, wherein the code generator includes means for developing early, on-time and late codes having a fixed delay interval between said early and late codes, and wherein the correlator means correlates the digitized IF converted signal with a digital local IF early signal developed from said early local code, and also correlates the digitized IF converted signal with a digital local IF late signal developed from said late local code, and wherein the tracking means includes envelope detection means for comparing the power of the digitized IF converted signal correlated with a respective said early or late local IF signal to determine a code chip error signal, said error signal being provided to the code generating means for shifting said early and late codes by an amount effective to maintain said on-time code in synchrony with the code of the received RF signal.

3. A receiver according to claim 2, wherein the means for generating said digital sin($f_o$) and cos($f_o$) signals includes a numerical control oscillator which is controlled by the tracking means.

4. A receiver according to claim 1, wherein said tracking means further includes means for adjusting the frequency of said code generating means in accordance with the Doppler shift of the received RF signal.

5. A receiver according to claim 1, wherein said tracking means includes
    means for developing a frequency error signal indicative of the difference between the frequency of said local IF signal and said digitized IF converted signal,
    IF frequency control means responsive to said frequency error signal for controlling the frequency of said local IF signal to match the frequency of said digitized IF converted signal, and
    means for maintaining the local sampling frequency at a frequency which is substantially equal to $4f_o$.

6. A receiver according to claim 5, wherein said IF frequency control means includes a numerical control oscillator.

7. A receiver according to claim 1, wherein the means for generating sin ($f_o$) and cos($f_o$) signals includes means for generating one-bit sine and cosine signals [so as to produce one-bit IF signals].

8. A receiver according to claim 1, wherein the means for multiplying the local code times a said sin($f_o$) or cos($f_o$) signal is an XOR gate.

9. A receiver according to claim 8, wherein the tracking means includes
    means for developing a code offset signal from an early and late code having a delay interval between said early and late codes;
    means for accumulating said code offset offset signal over plural sampling intervals to develop a code error signal; and
    means for shifting the local code by one sampling interval in response to said code error signal.

10. A receiver according to claim 1, wherein said local IF means develops 1-bit local IF signals, and wherein said correlator means includes an N×1 bit multiplier and accumulator.

11. A receiver according to claim 1, wherein the tracking means includes means for sluing the sampling frequency $f_s$ to maintain $f_s$ at substantially four times the received IF frequency $f_o$.

12. A receiver according to claim 10, further including
    means for developing plural digital code signals during a one code chip interval, including an early code signal and a late code signal;
    means for developing a code error signal from correlation signals developed from said early and said late code signals; and
    means responsive to said code error signal for shifting the code signals by one interval.

* * * * *